United States Patent
Suzuki et al.

(10) Patent No.: US 9,178,453 B2
(45) Date of Patent: Nov. 3, 2015

(54) DRIVING APPARATUS FOR SENSORLESS FAN MOTOR

(71) Applicant: ROHM CO., LTD., Ukyo-Ku, Kyoto (JP)

(72) Inventors: Toshiya Suzuki, Kyoto (JP); Yuki Gohara, Kyoto (JP)

(73) Assignee: ROHM CO., LTD. (JP)

( * ) Notice: Subject to any disclaimer, the term of this patent is extended or adjusted under 35 U.S.C. 154(b) by 168 days.

(21) Appl. No.: 14/085,216

(22) Filed: Nov. 20, 2013

(65) Prior Publication Data

US 2014/0152216 A1 Jun. 5, 2014

(30) Foreign Application Priority Data

Nov. 20, 2012 (JP) .................................. 2012-254505

(51) Int. Cl.
*H02P 7/08* (2006.01)
*H02P 6/12* (2006.01)
*H02P 6/18* (2006.01)

(52) U.S. Cl.
CPC . *H02P 6/12* (2013.01); *H02P 6/182* (2013.01)

(58) Field of Classification Search
USPC ............ 318/400.21, 782, 805, 400.34, 400.1, 318/400.13, 459; 361/33, 23
See application file for complete search history.

(56) References Cited

U.S. PATENT DOCUMENTS

| 4,403,177 A | * | 9/1983 | Weber et al. ............... 318/400.11 |
| 2002/0185926 A1 | * | 12/2002 | King et al. .................... 310/68 B |

FOREIGN PATENT DOCUMENTS

| JP | 10-234130 A | | 9/1998 |
| JP | 2000188893 A | * | 7/2000 |
| JP | 2005-006405 A | | 1/2005 |
| JP | 2005006405 A | * | 1/2005 |
| JP | 2012034466 A | * | 2/2012 |

* cited by examiner

*Primary Examiner* — Kawing Chan
*Assistant Examiner* — Jorge L Carrasquillo
(74) *Attorney, Agent, or Firm* — Cantor Colburn LLP

(57) ABSTRACT

According to the voltage $V_U$ that occurs at one end of at least one of multiple coils of a fan motor, a back electromotive force detection circuit generates a detection signal $BEMF_U$ asserted in a cyclic manner when a fan motor is stably rotating. A lock protection circuit detects a lock state of the fan motor rotor. A period detection unit measures the detection signal $BEMF_U$ period. A synchronization pulse generating circuit generates a synchronization pulse having a period that is 1/N (N represents an integer of 2 or more) of that of the detection signal $BEMF_U$ measured in a previous cycle. A lock judgment unit counts the synchronization pulse in increments of cycles of the detection signal $BEMF_U$. When the count value exceeds a predetermined threshold value M (M represents an integer of 2 or more) which is greater than N, the lock mode judgment signal is asserted.

15 Claims, 3 Drawing Sheets

DRIVING APPARATUS FOR SENSORLESS FAN MOTOR

CROSS REFERENCE TO RELATED APPLICATIONS

The present invention claims priority under 35 U.S.C. §119 to Japanese Application No. 2012-254505 filed Nov. 20, 2012, the entire content of which is incorporated herein by reference.

BACKGROUND OF THE INVENTION

1. Field of the Invention

The present invention relates to a motor driving technique.

2. Description of the Related Art

In recent years, increase in the operation speed of personal computers and workstations has led to rapid increase in the operation speeds of computation LSIs (large Scale Integrated Circuit) such as CPUs (Central Processing Unit), DSPs (Digital Signal Processor), etc. Such LSIs have a problem in that an increase in the operation speed, i.e., an increase in clock frequency involves an increase in heat generation. The heat generation of the LSI leads to thermal runaway of the LSI itself, or affects its peripheral circuits, which becomes a problem. Accordingly, such a situation requires a suitable thermal cooling operation for the LSI, as a crucial technique.

Examples of techniques for cooling an LSI includes an air-cooling cooling method employing a cooling fan. In this method, for example, a cooling fan is arranged such that it faces the surface of the LSI, and cool air is blown onto the surface of the LSI using the cooling fan.

With such a motor that drives such a cooling fan, if the motor locks due to a foreign substance being stuck in the cooling fan, this leads to an excessively large current flowing through a coil or a semiconductor element, which can damage the reliability of the device. In order to solve such a problem, a lock protection circuit is employed, which suspends the supply of electric power to the motor coil when the rotation of the motor stops.

In order to appropriately perform lock protection, there is a need to appropriately judge the motor rotation state. In a case in which the motor has a sensor such as a Hall element, such an arrangement is capable of judging in a sure manner based on the output signal from the sensor whether or not the motor is rotating (Patent document 1).

In contrast, in a case of employing a sensorless motor, such an arrangement cannot use the output signal from such a Hall element. In this case, such an arrangement requires an alternative method. Specifically, with such an arrangement, there is a need to judge the motor lock state based on the voltage (back electromotive force) that occurs across the motor coil.

As a technique for detecting the lock state of a sensorless motor, the present inventor has investigated the following technique (which will be referred to the "comparison technique"). A back electromotive force having a sine waveform occurs across the motor coil according to the rotation of the motor. With the comparison technique, a back electromotive force that occurs across at least one of the coils of the motor is compared with a common voltage of the coil by means of a comparator. When the motor is stably rotating, the back electromotive force thus generated crosses the common voltage in a cyclic manner. Thus, the output signal of the comparator (which will also be referred to as the "back electromotive force detection signal") transits in a cyclic manner. Conversely, if the motor locks, the back electromotive force is not generated. Accordingly, the back electromotive force detection signal is not generated. Thus, with such a comparison technique, a motor lock state can be detected by monitoring the back electromotive force. Specifically, when the back electromotive force detection signal is not asserted, judgment is made that a motor lock state has occurred. Related techniques are described in Japanese Patent Application Laid Open No. 2005-6405, and Japanese Patent Application Laid-Open No. H10-234130.

Examples of control methods widely employed for a three-phase brushless motor include a 120-degree conduction system and a 180-degree conduction system (sine wave driving). The 120-degree conduction system has an advantage of allowing the control operation to be performed in a simple manner. As a tradeoff problem, such a 120-degree conduction system has a disadvantage in that noise and vibration are likely to occur as compared with the 180-degree conduction system. In contrast, the 180-degree conduction system has an advantage of low noise and low vibration, and an advantage of high efficiency. However, once the control operation goes out of synchronization, the system goes out of control. In order to solve such a problem, the 180-degree conduction system requires a complicated control method, as compared with the 120-degree conduction system.

SUMMARY OF THE INVENTION

The present inventors have investigated the aforementioned comparison technique, and have come to recognize the following problem. In a case of employing a 120-degree conduction method or a 150-degree conduction method, when the rotor stops after the motor locks, the generation of the back electromotive force ceases. Thus, with such a comparison technique, detection can be made in a sure manner whether or not the motor has locked. However, in a case of employing a 180-degree conduction sine wave driving method, in some cases, the generation of the back electromotive force does not cease even if the motor has locked. Thus, such an arrangement is not capable of detecting whether or not the motor has locked.

The present invention has been made in order to solve such a problem. Accordingly, it is an exemplary purpose of an embodiment of the present invention to provide a motor driving circuit which is capable of detecting a motor lock state immediately after the motor has locked.

An embodiment of the present invention relates to a driving apparatus for a sensorless fan motor comprising multiple coils. The driving apparatus comprises: a back electromotive force detection circuit configured to compare a voltage that occurs at one end of at least one from among the multiple coils of the fan motor with a common voltage that occurs at a common connection node at which the multiple coils are connected together, and to generate, based on a comparison result, a detection signal which is asserted in a cyclic manner when the fan motor is stably rotating; a driving signal synthesizing circuit configured to generate, based on the detection signal, a driving control signal which instructs conduction states of the multiple coils; a driving circuit configured to apply a driving voltage to each of the multiple coils according to the driving control signal; and a lock protection circuit configured to detect a lock state of a rotor of the fan motor. The lock protection circuit comprises: a period detection unit configured to measure a period of the detection signal; a synchronization pulse generating circuit configured to generate a synchronization pulse having a period that is 1/N (N represents an integer of 2 or more) of the period of the detection signal measured in a previous cycle; and a lock judgment circuit configured to count the synchronization pulse in increments of cycles of the detection signal, and to assert a lock mode judgment signal when the count value exceeds a predetermined threshold value M (M represents an integer of 2 or more) which is greater than the aforementioned number N.

With some driving systems such as the 180-degree conduction sine wave driving system, even after the driving system goes out of synchronization (which will be referred to as the "out-of-step state" in the present specification) due to the occurrence of a motor lock state, assertion of the detection signal continues although the rotor is not rotating. With such an embodiment, when the period of the detection signal in a current cycle reaches M/N times the period of the detection signal measured in a previous cycle, judgment is made that such a detection result represents an indication of the occurrence of the out-of-step state. Thus, such an arrangement is capable of detecting a motor lock state in short period of time.

Also, an arrangement may be made in which M=N+1. With such an arrangement, when the period of the detection signal in the current cycle reaches (N+1)/N times the period of the detection signal that was measured in a previous cycle, a motor lock state can be detected. Thus, such an arrangement requires a detection delay which is only 1/N times the period Tp of the detection signal to detect a motor lock state, thereby providing very high-speed detection of a motor lock state.

Also, the detection signal may be obtained by comparing a back electromotive force that develops at one end of a coil with the common voltage.

Also, an arrangement may be made in which N=12.

Also, the detection signal may be obtained by combining signals each obtained by comparing a back electromotive force that occurs at one end of a corresponding coil of the multiple coils with the common voltage.

Also, when the detection signal is not asserted for a predetermined judgment period, the lock judgment circuit may assert the lock mode judgment signal.

With an embodiment, when the lock mode judgment signal is asserted, the supply of electric power to the sensorless fan motor may be suspended.

Also, the driving apparatus may further comprise a low-pass filter configured to receive a torque instruction signal which indicates a target torque of the sensorless fan motor, and to perform filtering of a signal having a value that corresponds to the torque instruction signal. Also, the driving signal synthesizing circuit may be configured to generate the diving control signal according to an output signal of the low-pass filter.

When the torque instruction signal suddenly falls, the period of the detection signal becomes longer even when a motor lock state has not occurred. In this state, in some cases, this leads to false detection of a motor lock state. In order to solve such a problem, by filtering the torque instruction signal, such an arrangement is capable of suppressing a sudden reduction in the torque, thereby preventing false detection of a motor lock state.

Also, the driving circuit may be configured to PWM (Pulse Width Modulation) drive the fan motor.

Also, the driving circuit may be configured to BTL (Bridged Transless) drive the fan motor.

Also, the driving apparatus may be configured to drive the sensorless fan motor using a 180-degree conduction sine wave driving method.

Another embodiment of the present invention relates to a cooling apparatus. The cooling apparatus comprises: a fan motor; and the aforementioned motor driving apparatus configured to drive the fan motor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Description will be made regarding an embodiment of the present invention with reference to a fan motor driving apparatus mounted on an electronic computer such as a personal computer, a workstation, or the like, and configured to drive a fan motor used to cool a CPU or the like.

Figure 1:
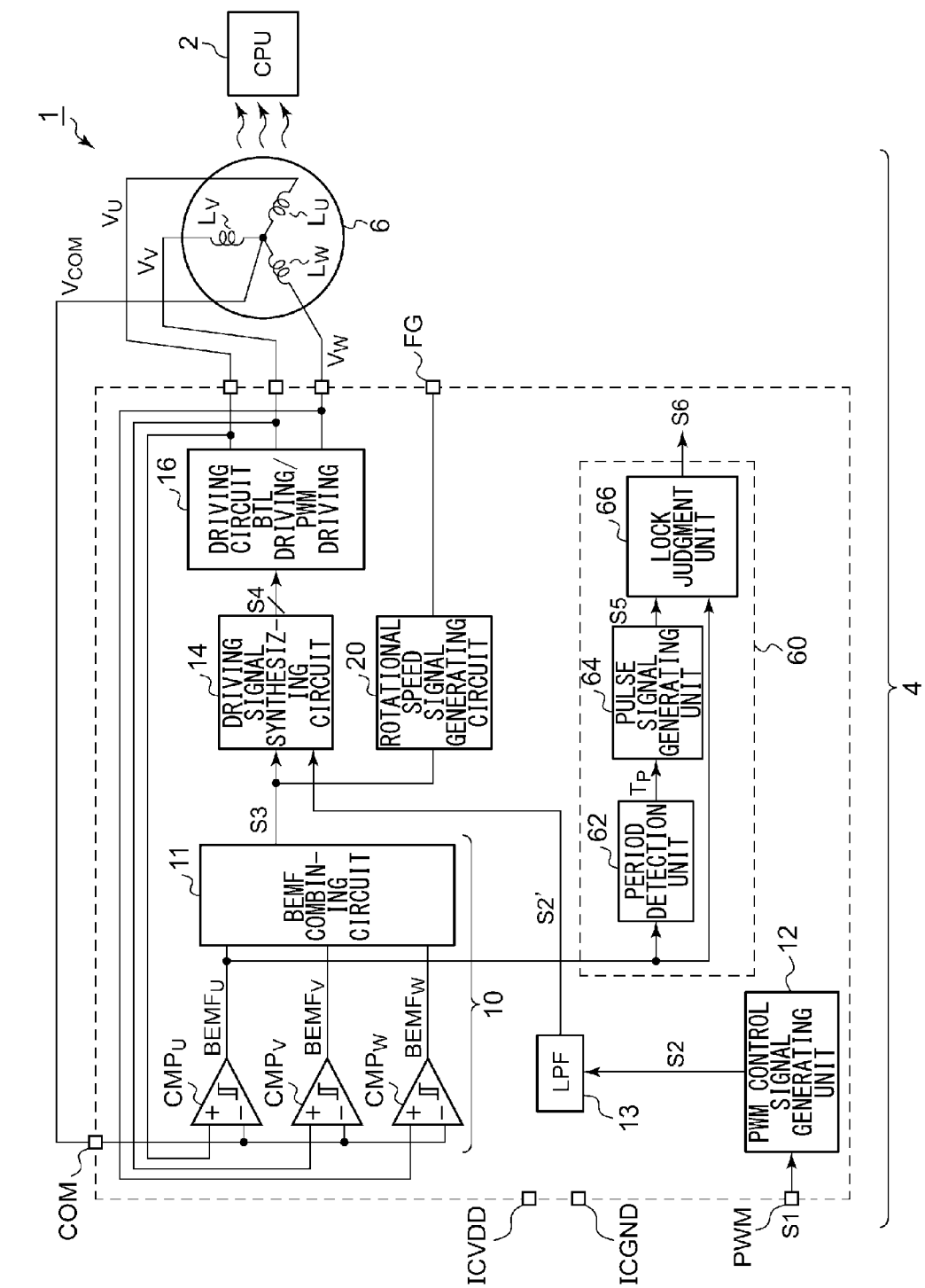
FIG. 1 is a block diagram showing a configuration of an electronic device including a cooling apparatus according to an embodiment.

First, description will be made with reference to FIG. 1 regarding the overall configuration of a driving apparatus 100 according to an embodiment. The driving apparatus 100 is mounted on a cooling apparatus 4 including a fan motor 6, and drives the fan motor 6. FIG. 1 is a block diagram showing a configuration of an electronic device 1 including the cooling apparatus 4 according to the embodiment.

The electronic device 1 is configured as an electronic computer such as a personal computer, a workstation, or the like, or otherwise a consumer electronics device such as a refrigerator, TV, or the like, and includes a cooling target, e.g., a CPU 2. The cooling apparatus 4 cools the CPU 2 by blowing air.

The cooling apparatus 4 includes the driving apparatus 100 and the fan motor 6. The fan motor 6 is arranged in the vicinity of the CPU 2 to be cooled. The driving apparatus 100 drives the fan motor 6 according to a torque instruction signal (which will be referred to simply as the "instruction signal" hereafter) which is supplied in order to indicate the torque (rotational speed) to be set for the fan motor 6. The cooling apparatus 4 is commercially available in the form of a module.

The fan motor 6 is a three-phase AC motor including star-connected coils, i.e., a U-phase coil $L_U$, a V-phase coil $L_V$, and a W-phase coil $L_W$, and an unshown permanent magnet. The number of poles of the fan motor 6 is not restricted in particular. For example, the fan motor 6 may have four poles.

The driving apparatus 100 is configured as a function IC (Integrated Circuit) integrated on a single semiconductor substrate. The power supply voltage is supplied to a power supply terminal ICVDD, and the ground voltage is supplied to a ground terminal ICGND.

The driving apparatus 100 includes a back electromotive force (BEMF) detection circuit 10, a PWM control signal generating circuit 12, a low-pass filter 13, a driving signal synthesizing circuit 14, a driving circuit 16, a rotational speed signal generating circuit 20, and a lock protection circuit 60.

The driving apparatus 100 drives the fan motor 6 using the 180-degree conduction method (sine wave driving method). Description will be made in the present embodiment regarding an arrangement in which the driving apparatus 100 PWM drives the fan motor 6.

The PWM control signal generating circuit 12 outputs a PWM control signal S2 that corresponds to the target torque of the fan motor 6. The PWM control signal generating circuit 12 receives, as an input signal from outside the driving apparatus 100, the instruction signal S1 which is pulse width modulated according to the target torque of the motor. The PWM control signal generating circuit 12 converts the instruction signal S1 thus received into a PWM control signal S2 in the form of a digital value. Also, the PWM control signal generating circuit 12 may receive, as the instruction signal S1, an analog voltage that corresponds to the ambient temperature Ta obtained by means of a thermistor or the like. The PWM control generating circuit 12 may generate a digital PWM control signal S2 according to the analog voltage thus received. Also, the PWM control signal generating circuit 12 may receive a digital instruction signal S1 which indicates the duty ratio from a host processor such as a CPU or the like. Also, the PWM control signal generating circuit 12 may generate the PWM control signal S2 according to the digital signal thus received.

The low-pass filter 13 smooths the PWM control signal S2 having a value that corresponds to the instruction signal S1, and outputs the PWM control signal S2 thus smoothed to the driving signal synthesizing circuit 14. The low-pass filter 13 may be configured as a digital integrator, for example. In a case in which the instruction signal S1 or the PWM control signal S2 that corresponds to the instruction signal S1 is configured as an analog voltage, the low-pass filter 13 may smooth the analog voltage.

The BEMF detection circuit 10 compares the back electromotive forces $V_U$, $V_V$, and $V_W$, which occur at respective one terminals of the star-connected U-phase coil $L_U$, V-phase coil $L_V$, and W-phase coil $L_W$, with a common voltage $V_{COM}$ that occurs at a common connection node N1 at which the three coils are connected together so as to generate a rotation detection signal S3 which is asserted periodically.

The BEMF detection circuit 10 includes comparators $CMP_U$, $CMP_V$, and $CMP_W$, respectively provided for the U phase, V phase, and W phase. The comparators $CMP_U$, $CMP_V$, and $CMP_W$ each compare the common voltage $V_{COM}$ with a corresponding one of the coil voltages (back electromotive forces) $V_U$, $V_V$, and $V_W$ that occur at respective one terminals of the coils $L_U$, $L_V$, and $L_W$ provided for the respective phases. The BEMF detection circuit 10 generates the detection signals $BEMF_U$, $BEMF_V$, and $BEMF_W$, which are each asserted every time the back electromotive force that occurs at the corresponding phase coil crosses the common voltage $V_{COM}$. When the fan motor 6 is stably rotating, the multiple detection signals $BEMF_U$, $BEMF_V$, and $BEMF_W$ are respectively asserted in a cyclic manner in synchronization with the rotation of the rotor. More specifically, the detection signals $BEMF_U$, $BEMF_V$, and $BEMF_W$ are sequentially asserted in cycles of an electrical angle of 360 degrees with phases sifted by 120 degrees from one another.

The BEMF combining circuit 11 logically combines the detection signals $BEMF_U$, $BEMF_V$, and $BEMF_W$ output from the respective comparators $CMP_U$, $CMP_V$, and $CMP_W$ so as to generate a rotation detection signal S3. The rotation detection signal S3 is asserted every time the fan motor 6 rotates by a predetermined electrical angle of 60 degrees. It should be noted that the configuration of the BEMF detection circuit 10 is not restricted to such an arrangement shown in FIG. 1. The BEMF detection circuit 10 may be configured using the comparator $CMP_U$ alone. In this case, the rotational detection signal S3 is configured as the detection signal $BEMF_U$.

The driving signal synthesizing circuit 14 receives the rotation detection signal S3 and the PWM control signal S2, and combines these signals so as to generate a driving control signal S4 such that a coil current having a sine waveform flows through each of the coils $L_U$, $L_V$, and $L_W$ for the respective phases. Specifically, the driving signal synthesizing circuit 14 predicts the phase (position) of the rotor of the fan motor 6 in the current cycle based on the rotation detection signal S3 acquired in the previous cycle. Furthermore, based on the phases thus predicted, the driving signal synthesizing circuit 14 generates the driving control signal S4 configured as digital values which indicate the driving voltages $V_U$, $V_V$, and $V_W$ which are to be respectively applied to the coils $L_U$, $L_V$, and $L_W$ provided for the respective phases.

The driving circuit 16 applies the driving voltages $V_U$, $V_V$, and $V_W$ to the respective one ends of the coils $L_U$, $L_V$, and $L_W$, according to the driving control signal S4. The driving circuit 16 PWM drives the fan motor 6. It should be noted the driving circuit 16 may BTL drive the fan motor 6, as described later.

Figure 2A:
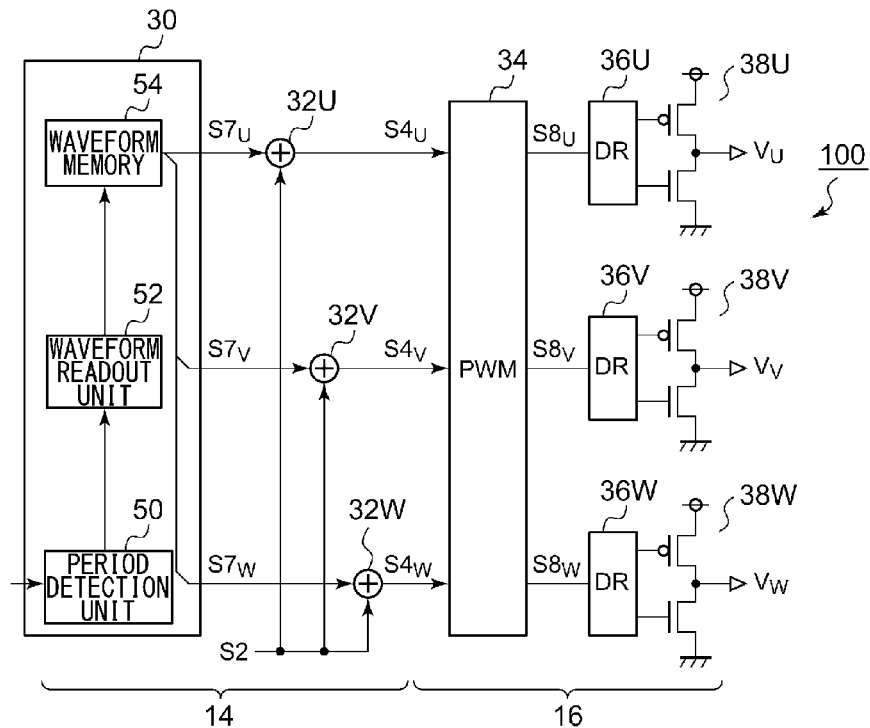
FIGS. 2A and 2B are circuit diagrams each showing configuration examples of a driving signal synthesizing circuit and a driving circuit.
Figure 2B:
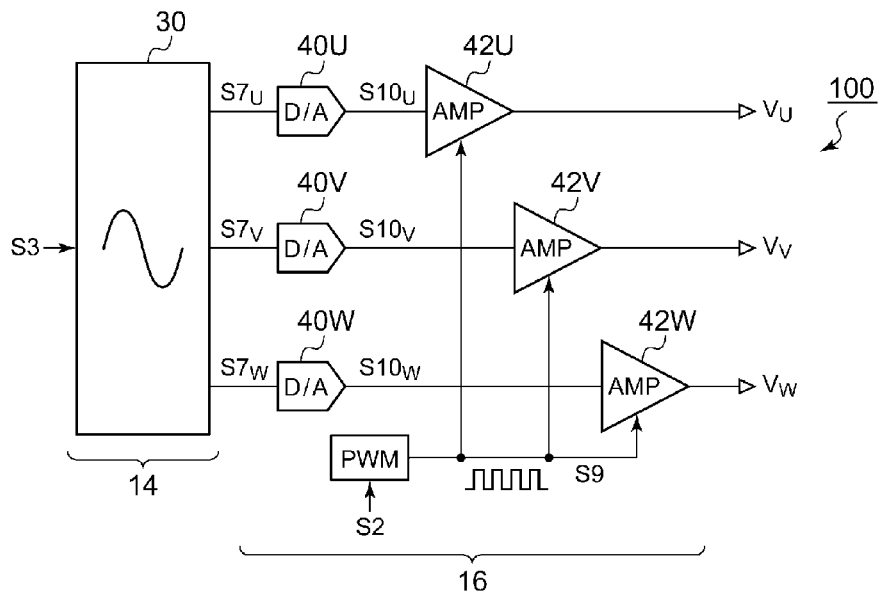

FIGS. 2A and 2B are diagrams each showing example configurations of the driving signal synthesizing circuit 14 and the driving circuit 16. The driving apparatus 100 shown in FIG. 2A PWM drives the fan motor 6.

The driving signal synthesizing circuit 14 includes a synchronization control unit 30 and a multiplier 32. According to the rotation detection signal S3 as a trigger, the synchronization control unit 30 reads out waveform data $S7_U$, $S7_V$, and $S7_W$, which are provided for the respective phases U, V, and W, and which have phase differences of 120 degrees from one another.

The synchronization control unit 30 includes a period detection unit 50, a waveform readout unit 52, and waveform memory 54. The waveform memory 56 holds sine wave waveform data having a normalized amplitude. The sine wave waveform data is not restricted to such a perfect sine wave waveform. Also, quasi-sine wave waveform data, e.g., trapezoidal wave waveform data, may be employed.

The period detection unit 50 measures the period of the rotation detection signal S3, and holds the values thus measured. The waveform readout unit 52 reads out the waveform data from the waveform memory 54 such that the period of the rotation detection signal S3 measured in the previous cycle is associated with a predetermined electrical angle. For example, in a case in which the rotation detection signal S3 is configured as the detection signal $BEMF_U$, the waveform readout unit 52 reads out the waveform data such that the measured period is associated with an electrical angle of 360 degrees, i.e., is associated with the period of the waveform data.

The multipliers 32U, 32V, and 32W respectively multiply the waveform data $S7_U$, $S7_V$, and $S7_W$ thus read out, by a PWM control signal S2' that corresponds to the torque instruction signal S1, so as to generate the driving control signals $S4_U$, $S4_V$, and $S4_W$.

The driving circuit 16 includes a pulse width modulator 34, a driver 36, and a bridge output stage 38. The pulse width modulator 34 pulse width modulates each of the driving control signals $S4_U$, $S4_V$, and $S4_W$. The inverter-type bridge output stages 38U, 38V, and 38W, and the drivers 36U, 36V, and 36W, are provided for the respective phases. The drivers 36U, 36V, and 36W respectively switch on and off the corresponding bridge output stages 38U, 38V, and 38W according to the PWM signals $S8_U$, $S8_V$, and $S8_W$ generated by the pulse width modulator 34.

The driving apparatus 100 shown in FIG. 2B BTL drives the fan motor 6. The driving signal synthesizing circuit 14 includes a waveform readout circuit 30. The driving signal synthesizing circuit 14 reads out the waveform data $S7_U$, $S7_V$, and $S7_W$ for the respective phases U, V, and W in synchronization with the rotation detection signal S3 in a cyclic manner with phase differences of 120 degrees. A PWM signal generating unit 39 generates a PWM signal S9 having a predetermined frequency and having a duty ratio that corresponds to the PWM control signal S2'.

D/A converters 40U, 40V, and 40W, and amplifiers 42U, 42V, and 42W, are provided for the respective phases. The D/A converters 40U, 40V, and 40W each perform D/A conversion of corresponding waveform data $S7_U$, $S7_V$, and $S7_W$. The amplifiers 40U, 40V, and 40W respectively apply the driving voltages $V_U$, $V_V$, and $V_W$, which correspond to the output signals $S10_U$, $S10_V$, and $S10_W$ output from the corresponding D/A converters 40U, 40V, and 40W, to respective one terminals of the coils $L_U$, $L_V$, and $L_W$. The driving voltages $V_U$, $V_V$, and $V_W$ respectively output from the amplifiers 40U, 40V, and 40W are each configured as a signal having an envelope waveform that matches the waveform of a corresponding one of the output signals $S10_U$, $S10_V$, and $S10_W$, which are output from the D/A converters 40U, 40V, and 40W. Furthermore, the driving voltages $V_U$, $V_V$, and $V_W$ are each configured as a pulse signal obtained by a switching operation according to the PWM signal S9.

It should be noted that the configurations of the driving signal synthesizing circuit 14 and the driving circuit 16 are not restricted in particular. Rather, known or prospectively available circuits may be employed.

Returning to FIG. 1, the rotational speed signal generating circuit 20 generates, based on the rotation detection signal S3, a rotational speed signal FG that transits with every mechanical angle (motor angle) of 180 degrees with respect to the fan motor 6, i.e., every time the fan motor 6 rotates a half-turn, and outputs the rotational speed signal FG thus generated via an FG terminal.

The lock protection circuit 60 is capable of detecting a lock state such as a state in which a foreign substance is stuck in the fan motor 6. When a lock state is detected, the lock protection circuit 60 executes a predetermined protection operation. For example, when a lock state is detected, the lock protection circuit 60 transmits a notice to the driving signal synthesizing circuit 14, the driving circuit 16, or otherwise an external DSP which generates the input signal S1. When the unit receives such a notice that a lock state has been detected, the unit performs an operation so as to suspend the supply of electric power to the fan motor 6 for a predetermined period of time.

The lock protection circuit 60 includes a period detection unit 62, a synchronization pulse generating unit 64, and a lock judgment unit 66. The period detection unit 62 receives a detection signal which is to be asserted every time the rotor rotates by a predetermined electrical angle while the fan motor 6 rotates stably. In the present embodiment, the detection signal to be received by the period detection unit 62 is configured as the U-phase detection signal $BEMF_U$ which is asserted with every electrical angle of 360 degrees. However, the present invention is not restricted to such an arrangement. Also, the detection signal may be configured as the V-phase detection signal $BEMF_V$ or the W-phase detection signal $BEMF_W$. Alternatively, the detection signal may be configured as the rotation detection signal S3 obtained by logically combining the detection signals $BEMF_U$, $BEMF_V$, and $BEMF_W$.

The period detection unit 62 measures the period Tp of the detection signal $BEMF_U$ for each cycle. The synchronization pulse generating unit 64 generates a synchronization pulse S5 having a period that is 1/N (N represents an integer of 2 or more) of the period Tp of the detection signal which was detected in the previous cycle.

The lock judgment unit 66 counts the synchronization pulse S5 for each cycle of the detection signal $BEMF_U$. When the count value CNT exceeds a predetermined threshold value M (M represents an integer of 2 or more), the lock judgment unit 66 asserts a lock mode judgment signal S6.

The threshold value M is set to (N+1), for example. Description will be made in the present embodiment regarding an arrangement in which N=12 and M=13. In this case, the synchronization pulse S5 has a period that corresponds to the 30-degree electrical angle of the rotor of the fan motor 6.

Furthermore, when the detection signal $BEMF_U$ is not asserted for a predetermined judgment period, the lock judgment circuit 60 asserts the lock mode judgment signal S6.

Figure 3:
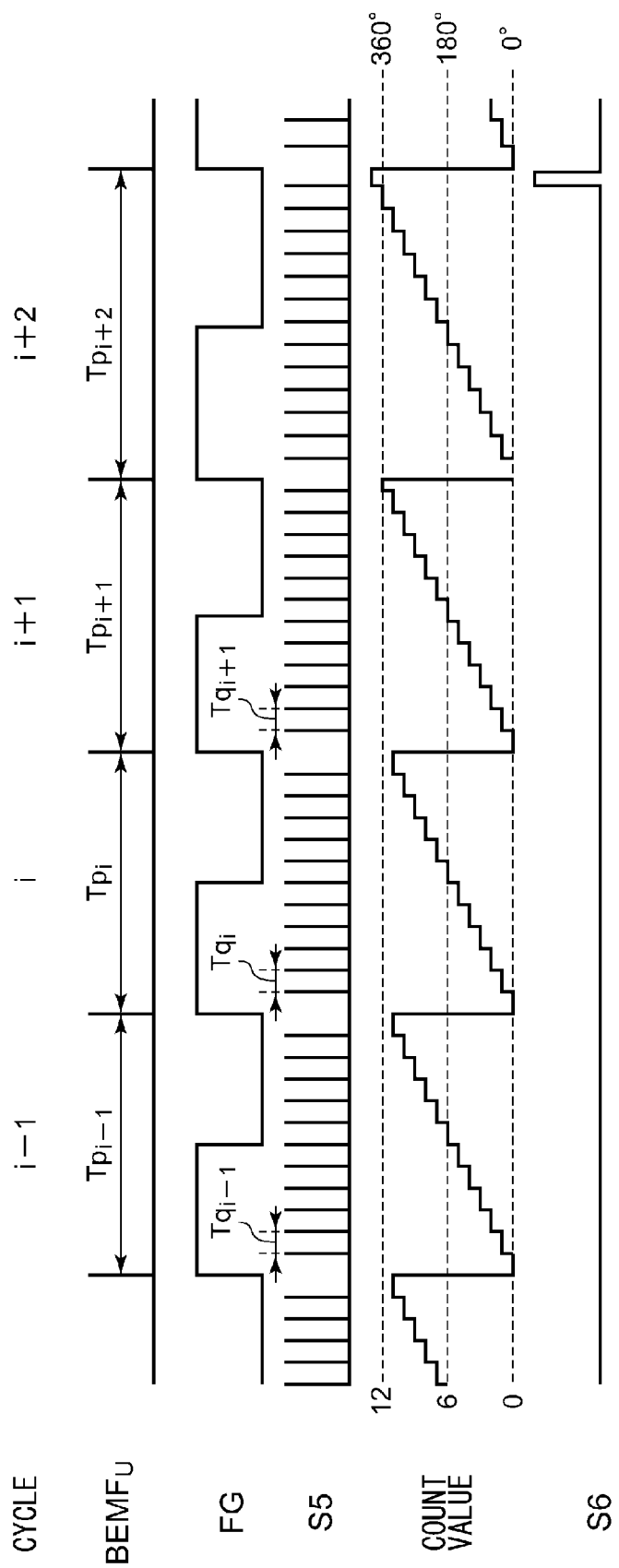
FIG. 3 is a waveform diagram showing the operation of the driving apparatus shown in FIG. 1.

The above is the configuration of the driving apparatus 100. Next, description will be made regarding the operation thereof. FIG. 3 is a waveform diagram showing the operation of the driving apparatus 100 shown in FIG. 1. When the rotor is stably rotating, the detection signal $BEMF_U$ is asserted with every electrical angle of 360 degrees. The period detection unit 62 measures the periods $Tp_{i-1}$, $Tp_i$, $Tp_{i+1}$, and so forth, of the detection signal $BEMF_U$ in increments of cycles.

During each cycle (i-th cycle), the synchronization pulse generating unit 64 generates the synchronization pulse S5 having a period Tq that is 1/N (N represents an integer of 2 or more) of the period of the detection signal $BEMF_U$ measured in the previous cycle, which is, more specifically, the period $T_{pi-1}$ of the detection signal $BEMF_U$ measured in the (i−1)-th cycle immediately before the current cycle.

$$Tq_i = T_{pi-1}/N$$

In a case in which N=12, when the rotor is stably rotating, the period of the synchronization pulse S5 corresponds to the 30-degree electrical angle.

When the rotor is stably rotating, it is expected that $Tp_{i-1}$, $Tp_i$, $Tp_{i+1}$, ..., are all the same. Thus, the expected value of the final count value CNT in the i-th cycle is N or otherwise (N−1).

On the other hand, if a lock state occurs in the rotor in a certain cycle, the control operation goes out of synchronization, leading to the out-of-step state. In this state, the rotor phase is delayed with respect to the applied phases of the driving signals $V_U$, $V_V$, and $V_W$. That is to say, the detection signal $BEMF_U$ is not asserted in the next timing although the driving signals $V_U$, $V_V$, and $V_W$ are each applied with an electrical angle of 360 degrees. This means that the period $Tp_{i+2}$ of the detection signal $BEMF_U$ in the current cycle is longer than the period $Tp_{i+1}$ in the immediately preceding cycle.

With the driving apparatus 100 according to the embodiment, when judgment is made that the final count value CNT counted in a given cycle exceeds the threshold value M (=N+1), the lock mode judgment signal S6 is asserted, i.e., judgment is made that a lock state has occurred. In the waveform diagram shown in FIG. 3, the count value CNT exceeds the threshold value M=13 in the (i+2) cycle. In this cycle, the lock mode judgment signal S6 is asserted.

In a case in which N=12 and M=13, when the detected angle of the rotor phase has a delay of 30 degrees or more with respect to the phases of the driving voltages $V_U$, $V_V$, and $V_W$, the lock protection circuit 60 judges that a lock state has occurred. Here, it should be noted that, in actuality, the rotor is stationary. Thus, the detected angle of the rotor phase is not equal to the actual rotational angle of the rotor.

As described above, with the driving apparatus 100, the period Tp of the detection signal $BEMF_U$ is measured for each cycle. When the period $Tp_i$ of the detection signal $BEMF_U$ in the current cycle reaches M/N times the period $Tp_{i-1}$ of the detection signal $BEMF_U$ which was measured in the previous cycle, this detection result is used as an indication which indicates the occurrence of the out-of-step state. Thus, such an arrangement is capable of detecting a motor lock state in a short period of time.

When the torque instruction signal suddenly falls, the period of the detection signal becomes longer. In some cases, this leads to false detection of a motor lock state even if a motor lock state has not occurred. With the driving apparatus 100 according to the embodiment, by filtering the torque instruction signal S2, such an arrangement is capable of suppressing a sudden reduction in the torque, thereby preventing such false detection.

Furthermore, when the detection signal $BEMF_U$ is not asserted for a predetermined judgment period, the lock judgment circuit 60 asserts the lock mode judgment signal S6. Thus, such an arrangement is capable of detecting the occurrence of a motor lock state even in a situation in which the detection signal $BEMF_U$ is not generated.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which M=N+1. Also, an arrangement may be made in which M is equal to or greater than (N+2).

Description has been made in the embodiment regarding an arrangement in which a motor lock state is detected in the 180-degree conduction sine wave driving control system. However, the present invention is not restricted to such an arrangement. There are other driving control systems in which the back electromotive force detection signal is generated in a cyclic manner even after a motor lock state has occurred. The present invention is applicable to such driving control systems.

Description has been made in the embodiment regarding an arrangement employing a three-phase motor. However, the number of the motor phases is not restricted in particular.

Description has been made in the embodiment regarding an arrangement in which the cooling apparatus 4 is mounted on the electronic device so as to cool the CPU. However, the usage of the present invention is not restricted to such an arrangement. Also, the present invention is applicable to various kinds of applications configured to cool a heat-generating component.

While the preferred embodiments of the present invention have been described using specific terms, such description is for illustrative purposes only, and it is to be understood that changes and variations may be made without departing from the spirit or scope of the appended claims.

What is claimed is:

1. A driving apparatus for a sensorless fan motor comprising a plurality of coils, the driving apparatus comprising:
    a back electromotive force detection circuit configured to compare a voltage that occurs at one end of at least one from among the plurality of coils of the fan motor with a common voltage that occurs at a common connection node at which the plurality of coils are connected together, and to generate, based on a comparison result, a detection signal which is asserted in a cyclic manner when the fan motor is stably rotating;
    a driving signal synthesizing circuit configured to generate, in synchronization with the detection signal, a driving control signal which instructs conduction states of the plurality of coils;
    a driving circuit configured to apply a driving voltage to each of the plurality of coils according to the driving control signal; and
    a lock protection circuit configured to detect a lock state of a rotor of the fan motor,
    wherein the lock protection circuit comprises:
        a period detection unit configured to measure a period of the detection signal;
        a synchronization pulse generating circuit configured to generate a synchronization pulse having a period that is 1/N (N represents an integer of 2 or more) of the period of the detection signal measured in a previous cycle; and
        a lock judgment circuit configured to count the synchronization pulse in increments of cycles of the detection signal, and to assert a lock mode judgment signal when the count value exceeds a predetermined threshold value M (M represents an integer of 2 or more) which is greater than the aforementioned number N.

2. The driving apparatus according to claim 1, wherein M=N+1.

3. The driving apparatus according to claim 1, wherein the detection signal is obtained by comparing a back electromotive force that develops at one end of a coil with the common voltage.

4. The driving apparatus according to claim 3, wherein N=12.

5. The driving apparatus according to claim 1, wherein the detection signal is obtained by combining signals each obtained by comparing a back electromotive force that occurs at one end of a corresponding coil of the plurality of coils with the common voltage.

6. The driving apparatus according to claim 1, wherein, when the detection signal is not asserted for a predetermined judgment period, the lock judgment circuit asserts the lock mode judgment signal.

7. The driving apparatus according to claim 1, wherein, when the lock mode judgment signal is asserted, the supply of electric power to the sensorless fan motor is suspended.

8. The driving apparatus according to claim 1, further comprising a low-pass filter configured to receive a torque instruction signal which indicates a target torque of the sensorless fan motor, and to perform filtering of a signal having a value that corresponds to the torque instruction signal, and wherein the driving signal synthesizing circuit is configured to generate the diving control signal according to an output signal of the low-pass filter.

9. The driving apparatus according to claim 1, wherein the driving circuit is configured to PWM (Pulse Width Modulation) drive the fan motor.

10. The driving apparatus according to claim 1, wherein the driving circuit is configured to BTL (Bridged Transless) drive the fan motor.

11. The driving apparatus according to claim 1, configured to drive the sensorless fan motor using a 180-degree conduction sine wave driving method.

12. A cooling apparatus comprising:

a fan motor; and the motor driving apparatus according to claim 1, configured to drive the fan motor.

13. A control method for a sensorless motor comprising a plurality of coils, the control method comprising:

comparing a voltage that occurs at one end of at least one from among the plurality of coils of the fan motor with a common voltage that occurs at a common connection node at which the plurality of coils are connected together, and generating, based on a comparison result, a detection signal which is asserted in a cyclic manner when the fan motor is stably rotating;

measuring a period of the detection signal;

generating a cyclic signal having a period that is 1/N (N represents an integer of 2 or more) of a period of the detection signal that was measured in a previous cycle; and counting the cyclic signal in increments of cycles of the detection signal, and asserting a lock mode judgment signal when the count value exceeds a predetermined threshold value M which is greater than the aforementioned N.

14. The control method according to claim 13, further comprising suspending a driving operation of the sensorless fan motor when the lock mode judgment signal is asserted.

15. The control method according to claim 13, wherein the sensorless motor is driven using a 180-degree conduction sine wave driving method.

\* \* \* \* \*